INVENTOR.
WILLIAM M. BROBECK

Patented Feb. 5, 1952

2,584,541

UNITED STATES PATENT OFFICE 2,584,541

VARIABLE-SPEED TRANSMISSION

William M. Brobeck, Berkeley, Calif.

Application November 24, 1947, Serial No. 787,748

9 Claims. (Cl. 74—191)

The present invention relates to variable speed transmissions, particularly to such transmissions which are operated by frictional contact between several members whose radial relationships can be changed to vary the speed of the driven members.

Friction contact variable speed transmissions have been useful in the accommodation of motors and engines to applications requiring a variety of speeds and power changed at the will of the operator such as motor cars, machine tools, and wherever controlled variations in speed are desired because of the infinite variation of speeds possible through the ranges for which the frictional contact members are designed. Unfortunately, due to several seemingly characteristic disadvantages, they have never enjoyed practical usage.

One of these disadvantages was slippage between the driving and driven members. It is apparent that enough force must be applied at the contact for operation at any given torque loading. On the other hand, where the driving and driven members are continuously forced into an extremely tight contact in an attempt to overcome slippage, excessive wear and early failure of the contact surfaces is produced, which is as great a disadvantage as the slippage.

An object of this invention therefore is to provide a means for automatic adjustment between the driving and driven members of a friction contact transmission which will eliminate slippage and still not unduly submit the bearings and the rollers to continuous high stresses which materially shorten their lives. As described hereafter, this is accomplished by a mechanism which varies the friction contact with the torque load imposed upon the motor and driving member and produces only the contacting force required to operate without slipping.

In the past one of the great difficulties has been shifting of the driving and driven members to the various radial relationships necessary to accomplish the changes in speed. This difficulty limited the choice of surfaces available for contact members. In most friction transmissions the changing mechanism had to be forced against centrifugal or centripetal force, the power of the motor and the axial friction of the members, with consequent strain on both operator and equipment.

Thus it is an object also to provide a means of varying the relationship between driving and driven members in a friction drive transmission which will operate easily and without burden or strain upon either the equipment or operator. Further, to provide at the same time a speed changing mechanism which will permit the use of driving and driven members having convex and concave interacting surfaces for improved friction contact.

It is among the objects of this invention to provide a device which combines the use of concave and convex coacting surfaces for frictional contact, a pressure means limiting the intensity of said frictional contact actuated by the torque of the driving end of the transmission, and the replacement of conventional adjustment mechanism with a unit which shifts the radial relationships of the driving and driven members without strain regardless of whether the transmission is in operation or at rest, under load or unloaded. The present invention makes it possible to adapt the great versatility of friction drive to applications such as automobiles, power tools, in fact anywhere where transmissions may be used to advantage, due to the elimination of hitherto objectionable characteristics.

Further objects are to provide a construction of maximum simplicity, economy and ease of assembly and disassembly and such further objects, advantages and capabilities as will fully appear and as are inherently possessed by the device and invention described herein.

The invention further resides in the combination, construction and arrangement of parts illustrated in the accompanying drawings and while there is shown therein a preferred embodiment, it is to be understood that the same is illustrative of the invention and that the invention is capable of modification and other uses and comprehends other details of construction without departing from the spirit thereof or the scope of the appended claims.

In the accompanying drawings forming a part of this specification and in which like numerals are employed to designate like parts throughout the same:

Figure 1:
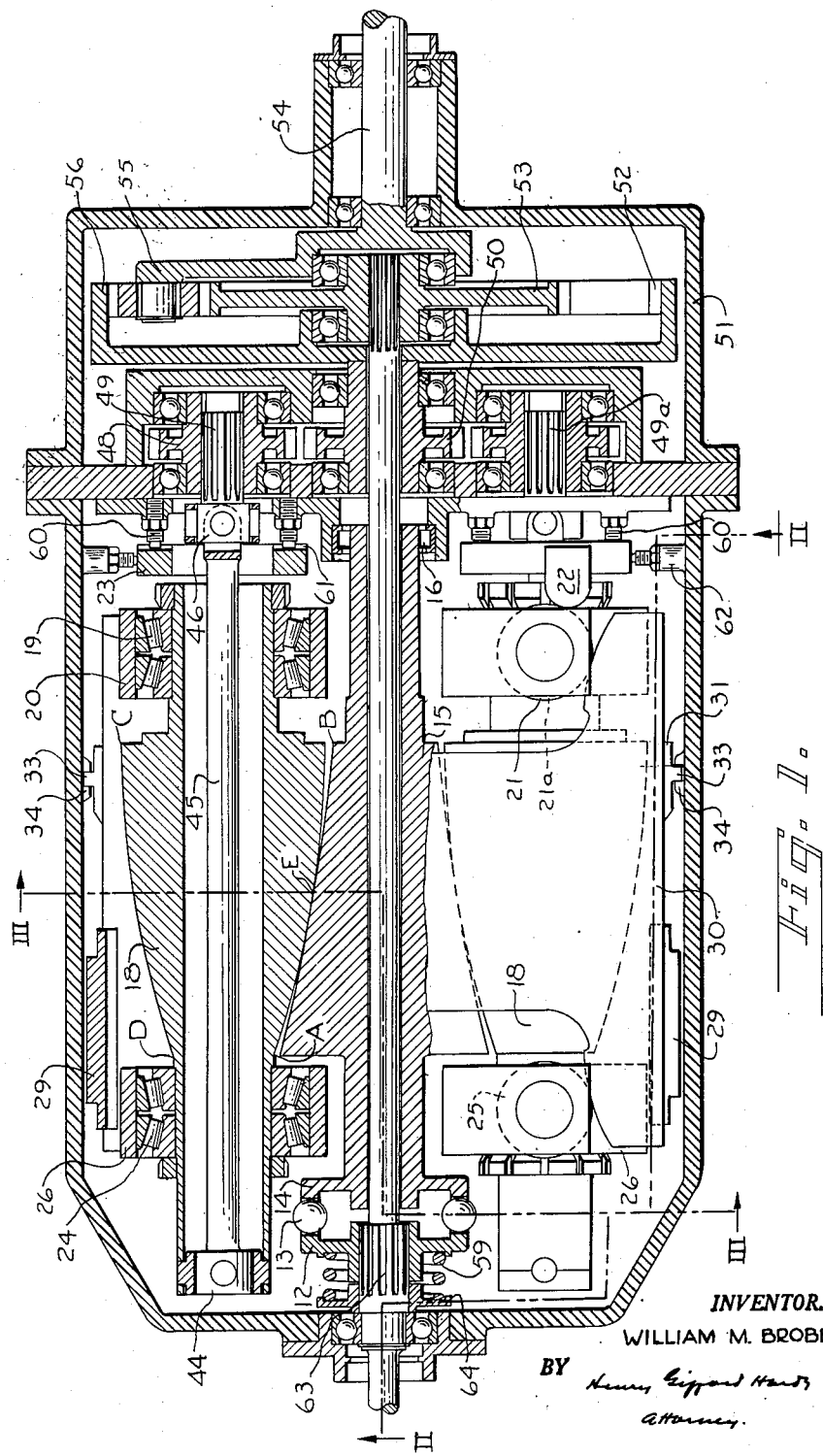
Figure 1 is a horizontal section view taken on the line I—I of Figure 3, with a portion thereof shown in top plan view, of the unit showing among other things, the position of the friction contact members and the driving mechanism.

Referring now specifically to the drawings and particularly to Figure 1, input shaft 11 is driven by any power source such as an electric motor or any kind of engine. The input shaft 11 carries cam 12 which is splined thereto or secured in any other suitable manner so that it rotates with the shaft. The inturned edge 12a of cam 12 is cut with spaced depressions 12b (see Figure 2) in the bottoms of which are located balls 13.

A similar but oppositely disposed cam 14 is secured to or formed integrally with the driving roller 15. The inner or driving roller 15 is supported at one end by the cam 14 and at the other end by bearing 16. Since the balls 13 are held between the diamond shaped depressions of the oppositely disposed cams 12 and 14 it is to be noted that as shaft 11 rotates in either direction it will cause the balls 13 to roll on the cam faces and tend to spread the cams apart against the action of spring 59. The shape of cams 12 and 14 is such that the spreading force is at all times proportional to the torque transmitted. Shaft 11 is free to rotate independently of the driven roller 15 but is held in engagement by the force caused from the cam 12 through the balls 13 to the cam 14. It is to be noted that the concave curve of the roller 15 represented by the curve A—B is a true arc of a circle. Adjacent to the inner driving roller 15 are twin rollers 18, one at either side thereof, which are identical in every respect. The rollers 18 have a convex curved surface represented by the curve C—D and are likewise true arcs of a circle but of smaller radius than that of the curve A—B. Bearing 16 supporting the inner roller 15 provides no axial restraint so that the axial motion of roller 15 produces a contacting force between the inner roller 15 and the two outer rollers 18. It is intended that the longitudinal axis of both the inner and outer rollers should lie in the same horizontal plane. The effect of the contact acting upon rollers 18 is to force each of them outwardly and at the same time in an axial direction. The axial component of the force is carried through the main bearing 19, bearing housing 20, rollers 21a (carried in the bearing housing 20 above and below the rollers 18) to thrust cams 22 mounted upon equalizing plate 23. The radial components of the contact between inner roller 15 and outer rollers 18 are taken through bearings 19 and 24, bearing housings 20 and 26 and rollers 25 (carried by the bearing housings 26) to lower and upper cam shifting plates 28 and 30 respectively.

The lower and upper cam plates 28 and 30 are identical in size and shape and are spaced above and below the inner and outer rollers 15 and 18. The shape of the cam plates is clearly shown in the diagram of Figure 4. The came surface 57 which abuts rollers 25 at the input end and rollers 21 at the output end can also be made a true arc of a circle.

The variable speed transmission portion of the device is contained within the housing 35. Within this housing the lower cam plate 28 is supported upon a butterfly shaped horizontal plate 31 having wing tips or tongues 33 which fit into guides 34 in the wall of case 35. This permits slight movement of the plate 31 but only at right angles to the roller axis. The lower cam plate 28 is permitted to move horizontally and parallel to the axis of the rollers because of the key 32 in keyway 32a. Cam plate 28 is solidly connected to the upper cam plate 30 by side members 29 so that the movement between them is integral and identical. Thus cam plates 28 and 30 are permitted to move axially and transversely but not to rotate.

Figure 2:
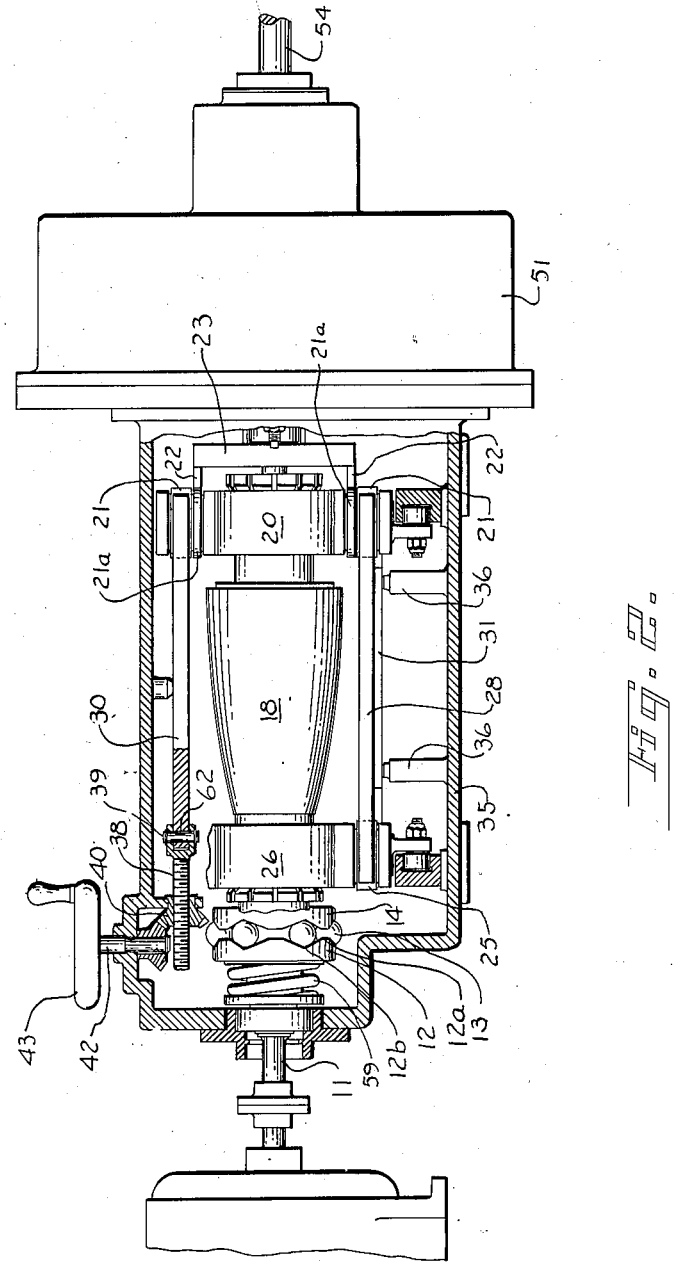
Figure 2 is a side elevational view partly in vertical section taken on the line II—II of Figure 1, and looking in the direction of the arrows, showing particularly the torque loading device.
Figure 3:
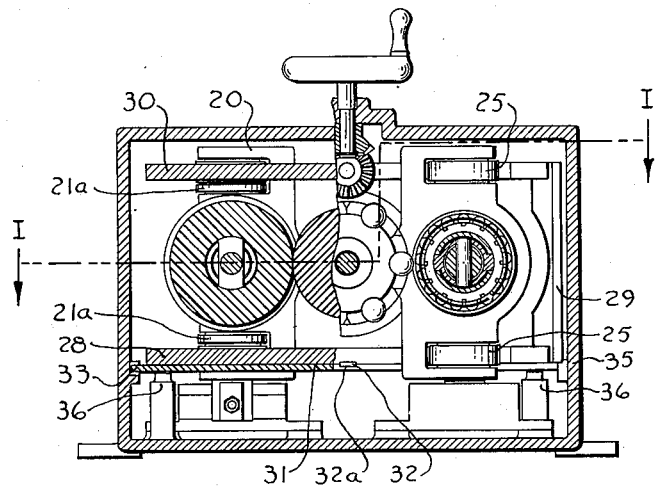
Figure 3 is an end elevational view partly in vertical section taken on the line III—III of Figure 1 and looking in the direction of the arrows, showing the adjustment arrangement for the friction contact.

The plate 31 supporting lower cam plate 28 and its uper counterpart, cam plate 30, is held in position at the base of the case 35 by supports 36 as shown in Figures 2 and 3. At the top cam plate 30 is held in position by depending supports 36a, the depending termini of which bear on the top surface of plate 30 directly above roller 15. To one end of the cam plate 30, preferably at the input end, is attached a screw 38 by means of pin 39 through the slot 62 in cam plate 30. Screw 38 passes through threaded bevel pinion 40 which meshes with pinion 41 carried on shaft 42 which is rotated by the handwheel 43. It is apparent that by the rotation of the handwheel 43 the upper cam plate 30 is moved forward and backward in a horizontal plane and since the lower cam plate 28 is rigidly joined with the upper plate 30, an identical motion is made by the lower cam plate 28. The purpose and function of the two integrally connected cam plates is to equalize the force on the two rollers 18.

Rollers 18 carry universal joints 44 to which are connected shafts 45 and universal joints 46 carried on shafts 49. The shafts 49 are free to slide axially inside gears 48 but are prevented from turning with respect to gears 48 by splines 49a. By locating universal joints 44 and 46 approximately equidistant to either side of the center of rollers 18 and in the correct angular relation to each other, the variation in angular velocity introduced by the action of the joints 44 and 46 can be largely cancelled out.

At the output end of the housing 51 contains a planetary gear train by which the ratio variation obtainable with rollers 15 and 18 can be changed to secure continuous variation from forward through zero output speed to reverse. Alternately the output could be taken from a single gear meshing with both gears 48 omitting the extension of shaft 11, through roller 15, if rotation in only one direction were desired.

As illustrated in the drawings, gears 48 drive gear 50 through idlers which are not shown. Gear 50 is positively connected to internal gear 52. Gear 53 is mounted on the extension of shaft 11. Shaft 54 carries spider 55 which in turn carries pinions 56. Since gear 53, planet pinions 56 and internal gear 52 constitute a planetary system, the speed of the shaft 11 may be combined with the speeds of gear 50, as determined by the ratio obtained through the rollers 15 and 18, to give overall speed variations between shaft 11 and shaft 54 from forward through zero to reverse speeds.

Figure 4:
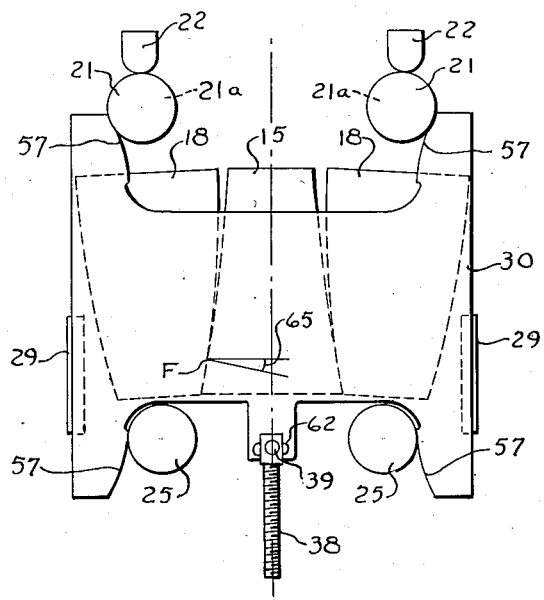
Figure 4 is a diagrammatic view illustrating the cam arrangement for shifting the position of the driven members to change speed, the position shown being substantially the minimum ratio (highest gear).

The diagrammatic cam arrangement shown in Figure 4 is the type of system preferred for changing the ratios between the speeds of driving roller 15 and driven rollers 18. The position of the rollers in Figure 1 shows a contact point E which is substantially a median point between the area of minimum ratio, i. e. as D approaches A, and the point of maximum ratio, i. e. as the point C approaches B. In order to shift and accomplish changes in speeds the handwheel 43 is rotated causing cam plates 30 and 28 to move parallel to the axis of the roller 15. The effect of this motion is to cause one end of the rollers 18 to approach each other and the opposite ends to separate. As shown in Figure 4 the input end of roller 15 has been moved so that the contact point is substantially at F and is approaching the point of minimum ratio (highest gear), and the output ends have correspondingly separated in a horizontal plane. As a result of the movement the points of contact between the roller 15 and the rollers 18 move toward one end, and the speed ratio changes according to the radii of the roller 15 and the rollers 18 at the point of contact. Each change of contact throughout the entire length of the rollers will result in a different gear ratio in both directions of rotation. As stated above cam surface 57 in both cam plates 28 and 30 can be approximated by true arcs of a circle. They are so calculated as to give a rocking motion to the shifting of contact points with only a negligible amount of sliding motion. Cam surfaces 57 bear against the curved surface of rollers 21. It will be observed that as the cam plate 30 shifts the contact point from that shown in Figure 1 at E to that shown at F in Figure 4, the rollers 21 and 25 will rotate in a counterclockwise direction and vice versa when the cam plates are moved in the opposite direction. The rollers 21a, which are directly beneath rollers 21, bear against the curved surface of the thrust cams 22 mounted at the top and bottom of each of the two equalizing plates 23. The equalizing plates 23 are held against longitudinal movement by stops 60, the termini of which rest within grooves 61 cut in the face of equalizing plates 23. They are held against lateral movement by stops 62 which bear against the outer edge of the equalizer plates 23. As handwheel 43 is moved, the plates 28 and 30 move longitudinally and cause the rollers 18 to shift contact points with respect to the roller 15 with substantially no sliding and very little axial motion of roller 15 occurs. This makes it possible to change the ratio whether the rollers are running at high speed or stopped, and with or without load, with a minimum of effort applied at the handwheel 43. While it has been disclosed herein that the change of ratio may be accomplished by the rotation of handwheel 43 it is apparent that the present invention contemplates the use of any other suitable means for moving the shifting cams and accomplishing this result.

It is apparent that the unique means provided to vary the contacting force between the rollers 15 and 18 automatically as the load increases or decreases, is one of the prime advantages of this device. Thus, the contacting force between rollers 15 and 18 is governed by the tangential force at the contact required to transmit the various ratios. This is so arranged that, except near zero torque, the contacting force is always maintained at a constant ratio to the force at which slipping would occur and the spring 59 maintains a small contacting force sufficient to prevent the rollers separating at zero torque.

This contact or tangential pressure is produced by the wedging action of roller 15 moving axially between rollers 18. Cams 12 and 14 through balls 13, coact to produce an axial force for moving roller 15 proportional to the torque carried by shaft 11. Coil spring 59 encircling shaft 11 inside the casing 35 forces cam 12 away from the casing 35 and produces a small axial force sufficient to keep the rollers 15 and 18 from separating at zero torque. As the torque on the shaft increases a point is reached when the axial force between the cams 12 and 14 through balls 13, becomes greater than that of spring 59 at which point cam 12 moves along the spline 63 on shaft 11 until it comes in contact with the spring retainer 64. At torque values above this point spring 59 has no effect and the axial force on cam 14 is directly proportional to the torque acting upon it.

The concave curve of roller 15 shown in Figure 1 as the curve A—B is calculated so that the sine of angle 65 in Figure 4, between the radius of the roller and a line perpendicular to a tangent at the point of contact, increases approximately in proportion to the radius. As practically applied, the contour of roller 15 can be made an arc of a circle and the sine of angle 65 can be proportional to the radius at any two points in the length of the roller, departing from proportional by only a few percent at the other points.

Inasmuch as the contact pressure which acts perpendicular to the surface of the rollers is proportioned to the axial force divided by the sine of the angle 65 and as the tangential force transmitted is proportional to the torque on rollers 18 divided by the radius and furthermore that through the action of cams 12 and 14 the axial force is proportional to the torque applied, it can be seen that the ratio of contact force to tangential force will be substantially constant at all ratios and torques greater than those necessary to compress springs 59.

In order to insure self-alignment of the rollers 18, support plate 31 is free to move at right angles to the axis of the rollers 15 and 18 to the extent that the tongues 33 are permitted to move in guides 34. Similar movement is accepted by the movement of pin 39 in slot 62. Accordingly, rollers 18 are movable in a direction at right angles to the axis of roller 15 to prevent unbalance between the force on the opposite sides of roller 15, which might interfere with the action of cams 12 and 14.

Although the description proceeds from the viewpoint that shaft 11 is the input shaft connected to a power source, it is to be understood that the same can be reversed and the power source connected to shaft 54. In this event shaft 54 becomes the input shaft and shaft 11 becomes the means for obtaining the overall speed variations in precisely the same manner as described.

Likewise it is to be understood that although balls 13 are shown and described any rolling elements will function in precisely the same way and are included herein. Also as described about the true arcs of circles referred to may be approximated without materially affecting the operation of the device.

I claim:

1. In a variable speed friction transmission a driving shaft operably connected to a source of rotating power, a first cam splined to said driving shaft, a driving roller operable to vary the contact force in proportion to the tangential force, the said driving roller having a longitudinal concave curved surface which curve is the true arc of a circle, a second cam integral with said driving roller with its cam face opposed to the cam face of said first cam, a plurality of balls retained between the cam surfaces of said first and second cams for transmitting the motion from one to the other, a pair of substantially identical driven rollers having their longitudinal axis in substantially the same horizontal plane as that of the driving roller and having longitudinal convex curved surfaces the curve of which is the true arc of a circle, means operable in conjunction with the said first and second cams for varying the contact force between said driving roller and said driven rollers automatically as the load increases or decreases, an output shaft, and means for securing the effects of the operation of said contacting rollers on the said output shaft.

2. In a variable speed friction transmission a driving shaft operably connected to a source of rotating power, a first cam splined to said driving shaft, a driving roller operable to vary the contact force in proportion to the tangential force, the said driving roller having a longitudinal concave curved surface which curve is the true arc of a circle, a second cam integral with said driving roller with its cam face opposed to the cam face of said first cam, a plurality of balls retained between the cam surfaces of said first and second cams for transmitting the motion from one to the other, a pair of substantially identical driven rollers having their longitudinal axis in substantially the same horizontal plane as that of the driving roller and having longitudinal convex curved surfaces the curve of which is the true arc of a circle, means for moving the contact points between said driving and driven rollers throughout their axial length to accomplish speed ratio changes, means operable in conjunction with the said first and second cams for varying the contact force between said driving roller and said driven rollers automatically as the load increases or decreases, an output shaft, and means for securing the effects of the operation of said contacting rollers on the said output shaft.

3. In a variable speed friction transmission a driving shaft operably connected to a source of rotating power, a first cam splined to said driving shaft, a driving roller operable to vary the contact force in proportion to the tangential force, the said driving roller having a longitudinal concave curved surface which curve is the true arc of a circle, a second cam integral with said driving roller with its cam face opposed to the cam face of said first cam, a plurality of balls retained between the cam surfaces of said first and second cams for transmitting the motion from one to the other, a pair of substantially identical driven rollers having their longitudinal axis in substantially the same horizontal plane as that of the driving roller and having longitudinal convex curved surfaces the curve of which is the true arc of a circle, a pair of identically formed and moving cam plates for moving the contact points between said driving and driven rollers throughout their axial length with a rocking motion to accomplish speed ratio changes, means for moving said cam plates by which the contact point changes are effected, means operable in conjunction with the said first and second cams for varying the contact force between said driving roller and said driven rollers automatically as the load increases or decreases, an output shaft, and means for securing the effects of the operation of said contacting rollers on the said output shaft.

4. A variable speed friction transmission comprising in combination a driving shaft operably connected to a source of rotating power, a first cam rotatable with said driving shaft, a driving roller operable to vary the contact force in proportion to the tangential force, the said driving roller having a longitudinal concave curved surface which approximates a true arc of a circle, a second cam rotatable with said driving roller having its cam face opposed to the cam face of said first cam, a plurality of rolling elements between the cam faces of said first and second cams for transmitting the motion from one to the other, a pair of substantially identical driven rollers one on either side of said driving roller and in contact therewith, all with their longitudinal axis in substantially the same horizontal plane, having a longitudinal convex curved surface which approximates a true arc of a circle, means operable in conjunction with the said first and second cams for varying the contact force between said driving the driven rollers regardless of the place of contact as the load increases or decreases, an output shaft, and means for securing the effects of the operation of said contacting rollers on the output shaft.

5. A variable speed friction transmission comprising in combination a driving shaft operably connected to a source of rotating power, a first cam rotatable with said driving shaft, a driving roller operable to vary the contact force in proportion to the tangential force, the said driving roller having a longitudinal concave curved surface which approximates a true arc of a circle, a second cam rotatable with said driving roller having its cam face opposed to the cam face of said first cam, a plurality of rolling elements between the cam faces of said first and second cams for transmitting the motion from one to the other, a pair of substantially identical driven rollers one on either side of said driving roller and in contact therewith, all with their longitudinal axis in substantially the same horizontal plane, having a longitudinal convex curved surface which approximates a true arc of a circle, means for moving the contact points between said rollers throughout their axial length to accomplish speed ratio changes, means operable in conjunction with the said first and second cams for varying the contact force between said driving and driven rollers regardless of the place of contact as the load increases or decreases, an output shaft, and means for securing the effects of the operation of said contacting rollers on the output shaft.

6. A variable speed friction transmission comprising in combination a driving shaft operably connected to a source of rotating power, a first cam rotatable with said driving shaft, a driving roller operable to vary the contact force in proportion to the tangential force, the said driving roller having a longitudinal concave curved surface which approximates a true arc of a circle, a second cam rotatable with said driving roller having its cam face opposed to the cam face of said first cam, a plurality of rolling elements between the cam faces of said first and second cams for transmitting the motion from one to the other, a pair of substantially identical driven rollers one on either side of said driving roller and in contact therewith, all with their longitudinal axis in substantially the same horizontal plane, having a longitudinal convex curved surface which approximates a true arc of a circle, a pair of identically formed and moving cam plates for moving the contact points between said rollers throughout their axial length with a rocking motion, to accomplish speed ratio changes, means for moving said cam plates by which the contact point changes are effected, means operable in conjunction with the said first and second cams for varying the contact force between said driving and driven rollers regardless of the place of contact as the load increases or decreases, an output shaft, and means for securing the effects of the operation of said contacting rollers on the output shaft.

7. A variable speed transmission comprising co-operable, oppositely tapered, first and second rollers arranged to be in tangential, rolling contact with each other, at least one of said rollers being mounted for shifting axially with respect to the other roller to vary the speed ratio therebetween, the surface of one roller being convex and the surface of the other roller being concave, said surfaces being so developed that the sine of the angle included between a radius of the concave roller and a line perpendicular to a tangent at the point of contact of the rollers varies approximately in proportion to said radius at the point of contact.

8. A variable speed transmission comprising co-operable, oppositely tapered, first and second rollers arranged to be in tangential, rolling contact with each other, at least one of said rollers being mounted for shifting axially to vary the speed ratio therebetween, one of said rollers having a convex surface and the other of the said rollers having a concave surface developed as an arc of a circle, the said contacting surfaces being so developed that the sine of the angle included between a radius of the concave roller and a line perpendicular to a tangent at the point of contact is proportional to the radius of the concave roller at any two selected points along the length of said concave roller and departs from such proportionality by only a small amount at other points along the length of said concave roller.

9. A torque loading device of the character described comprising co-axial, rotatable driving and driven members, a first cam means fixed to the driven member, a second cam means slidably but non-rotatably mounted on the driving member, yieldable means urging said second cam means towards said first cam means, said first and second cam means cut with oppositely disposed spaced depressions and means disposed in said spaced depressions between said cam members and supported thereby for transmitting motion of said second cam member to said first cam member.

WILLIAM M. BROBECK.

REFERENCES CITED

The following references are of record in the file of this patent:

UNITED STATES PATENTS

| Number | Name | Date |
| --- | --- | --- |
| 2,097,007 | Weisel | Oct. 26, 1937 |
| 2,125,998 | Erban | Aug. 9, 1938 |
| 2,252,630 | Heer | Aug. 12, 1941 |

FOREIGN PATENTS

| Number | Country | Date |
| --- | --- | --- |
| 446,325 | France | Sept. 30, 1912 |